United States Patent [19]

Smith

[11] Patent Number: 5,434,572
[45] Date of Patent: Jul. 18, 1995

[54] SYSTEM AND METHOD FOR INITIATING COMMUNICATIONS BETWEEN A CONTROLLER AND A SELECTED SUBSET OF MULTIPLE TRANSPONDERS IN A COMMON RF FIELD

[75] Inventor: Gregory M. Smith, Colorado Springs, Colo.

[73] Assignee: Ramtron International Corporation, Colorado Springs, Colo.

[21] Appl. No.: 255,088

[22] Filed: Jun. 7, 1994

[51] Int. Cl.⁶ ............................................. G01S 13/76
[52] U.S. Cl. ......................................... 342/44; 342/51
[58] Field of Search .............................. 342/51, 44, 42

[56] References Cited

U.S. PATENT DOCUMENTS

| | | | |
|---|---|---|---|
| 4,381,562 | 4/1983 | Acampora | 370/97 |
| 4,388,690 | 6/1983 | Lumsden | 364/483 |
| 4,963,887 | 10/1990 | Kawashima et al. | 342/44 |
| 5,144,314 | 9/1992 | Malmberg et al. | 342/44 |
| 5,245,332 | 9/1993 | Katzenstein | 340/825.54 |
| 5,287,112 | 2/1994 | Schuermann | 342/42 |
| 5,311,185 | 5/1994 | Hochstein et al. | 342/44 |
| 5,347,280 | 9/1994 | Schuermann | 342/42 |
| 5,374,930 | 12/1994 | Schuermann | 342/42 |

Primary Examiner—John B. Sotomayor
Attorney, Agent, or Firm—William J. Kubida

[57] ABSTRACT

A system and method for initiating communication between a controller and a selected one or other subset of multiple transponders in a common RF field in which each transponder has a unique, (or commonly unique) preprogrammed ID number. The controller transmits a series of commands/questions to the transponders and they either respond, or do not respond, to the controller based on their ID number, with the non-responding transponders entering a reset state. The transponders respond to the controller in such a way that, if multiple transponders respond, the controller can recognize that at least one transponder has responded and, for individual responses, the controller is not required to determine how many transponders have responded. Through use of the communications system and method disclosed, a sequence of controller commands and transponder responses single out a selected individual transponder or group of transponders based upon its particular ID number.

29 Claims, 5 Drawing Sheets

Fig_1

Fig_3A

Fig. 3B

SYSTEM AND METHOD FOR INITIATING COMMUNICATIONS BETWEEN A CONTROLLER AND A SELECTED SUBSET OF MULTIPLE TRANSPONDERS IN A COMMON RF FIELD

CROSS REFERENCE TO RELATED APPLICATIONS

The present invention is related to that described in U.S. patent application Ser. Nos. 08/194,706 entitled "INTEGRATION OF HIGH VALUE CAPACITOR WITH FERROELECTRIC MEMORY" filed on Feb. 10, 1994; and 08/210,699 entitled "SYSTEM AND METHOD FOR WRITE-PROTECTING PREDETERMINED PORTIONS OF A MEMORY ARRAY", filed on Mar. 18, 1994 both assigned to the assignee of the present invention, the disclosures of which are hereby specifically incorporated by this reference.

BACKGROUND OF THE INVENTION

The present invention relates, in general, to the field of radio frequency ("RF") identification ("ID") systems. More particularly, the present invention relates to a system and method for initiating communications between a controller and a selected one or other subset of multiple transponders in a common RF field. The system and method of the present invention is of particular utility in conjunction with the Racom RFM256 passive, proximity RF read/write card transponder ("RF/ID Tag") and an associated RFC100 CORE reader/writer electronics module controller available from Racom Systems, Inc., 6080 Greenwood Plaza Boulevard, Englewood, Colo., 80111 or other similar devices.

The Racom RFM256 is a passive RF transponder incorporating a non-volatile memory element which is powered by inductive coupling to a proximately located RF controller. The Racom communication system utilizes the controller to frequency shift key ("FSK") the powering RF signal to cause the transponder to either read data from, or write data to, the non-volatile memory and transmit the same back to the controller utilizing phase shift keying ("PSK") modulation in response to specific commands from the controller. The Racom communications system may operate in either full duplex or half duplex modes with the controller causing the transponder to simultaneously write data to its non-volatile memory array as the contents are read out and transmitted to the controller by complementing selected bits thereof. The Racom RFM256 transponder utilizes a ferroelectric random access memory ("FRAM®") non-volatile integrated circuit memory array manufactured using a proprietary lead-zirconate-titanate ("PZT") ceramic thin film process and is available from Ramtron International Corporation, Colorado Springs, Colo., the assignee of the present invention.

In operation, the Racom communication system utilizes FSK modulated RF signals transmitted from the controller to the transponder from which the latter derives it power. The use of FSK modulation allows the average signal power to remain at a maximum as opposed to other modulation techniques such as amplitude shift keying ("ASK") or pulse modulation techniques and the transponder is able to demodulate the FSK encoded signal without the incorporation of an on-chip oscillator frequency reference. In the current Racom RFM256 transponder system, a controller modulates a data signal between 125 KHz and 116.3 KHz to send a four bit time synchronization block, a start bit, memory address and command bits which are operative to cause the transponder to read: a) only the word at such address or b) the entire contents of the memory beginning at such address.

The RFM256 transponder, upon power up by entering the electromagnetic field of the associated controller, continuously transmits a configuration word to the controller utilizing a coherent PSK modulated signal of 62.5 KHz derived from the 125 KHz FSK RF input.

Utilizing the combination of FSK and PSK modulation techniques, in conjunction with a ferroelectric memory array, allows the transponder "write" range to be the same as the "read" range and effectively precludes interference between read and write commands or other transponders which may be within the RF signal range of the controller. Each RFM256 transponder configuration word includes a sync block and start bit corresponding with those portions of the controller command word as well as the number of bits designating the memory words which have been previously "locked" from further writes by the controller. A number of "hard-wired" mask bits and type bits are utilized to identify a particular transponder, or other subset of multiple transponders, to the controller and distinguish it from others. These or other memory locations within the ferroelectric memory array may be utilized to establish a unique ID number for a given transponder or a uniquely common ID number for a selected subset of multiple transponders with which the controller may desire to communicate.

The Racom transponder and communications system may be operated in either half duplex or full duplex mode. In the former instance, the transponder will transmit the requested words from memory in response to a "read" command beginning at the words specified in the word address portion of the command word. Utilizing this protocol, the controller must first know the contents of the transponder memory before initiating a "write" which operation is effectuated by sending a burst of 116.3 KHz RF power in synchronization with each bit read out of the transponder memory that is desired to complement. Typically, the controller will then initiate another "read" of the relevant portions of the transponder memory to verify that the write operation has been properly effectuated.

Alternatively, the communication system may be operated in full duplex mode whereby the read/write/verify operations are effectuated in a single pass operation. In this mode, the controller will complement the selected bits of the memory words as they are read out by the transponder and verify that the data was written properly during each of the single bit times.

SUMMARY OF THE INVENTION

With respect to the Racom and other RF/ID tag communication systems, it is important that the controller, or "reader" be able to single out a particular transponder, or selected subset of transponders, from among the plurality which may be within the powering RF field of the controller at any time. In one embodiment, by identifying a particular transponder and singularizing it from all others, communications between the controller and the particular transponder(s) are rendered more secure by eliminating the possibility that two or more transponders might attempt to communicate with the controller at the same time thereby interfering with each other resulting in the possible corruption of data read or written between the controller and transponder. In an alternative embodiment, the system and method herein disclosed may be utilized to communicate with a selected subset of multiple transponders each having a uniquely common ID number or ID number portion in those applications in which, for example, it is desired to write data to a selected group of transponders simultaneously. This latter embodiment has particular utility in baggage tag applications wherein all transponders associated with luggage to be directed to a given destination may be written with the same destination information concurrently.

In accordance with a particular embodiment of the system and method of the present invention, each transponder has a unique (or uniquely common) ID number programmed into it in the form of any combination of "mask" bits, "type" bits and/or other selected bits within the non-volatile memory. The transponder receives from the controller a series of commands/questions and either responds or does not respond based on this ID number. The transponder responds to the controller in such a way that, if multiple transponders respond, the controller can recognize that at least one transponder has responded. For individual responses, the controller is not required to determine how many transponders have responded. Fundamentally, the controller sends a sequence of commands that single out an individual transponder or group of transponders based upon the ID number sought.

Broadly disclosed is a method for initiating communications between a controller and a selected subset of a plurality of transponders wherein each of the transponders includes an n-bit digital address. A first subset of the plurality of the transponders having a possible first bit as the first bit of its n-bit digital address transmits a signal to the controller in response to a signal from the controller inquiring as to whether or not the transponders have the possible first bit in the first bit position. The non-responsively transmitting transponders alternatively enter a reset state if the first bit of their n-bit digital address is not the possible first bit. The controller next transmits a next digital signal to the responding plurality of transponders representative of a possible next bit of the n-bit digital address of the first subset of the plurality of transponders. A second subset of the first subset of transponders having the possible next bit as the next bit of its n-bit digital address responsively transmits a signal to the controller and the non-responsively transmitting transponders alternatively enter a reset state. The controller alternatively transmits additional next digital signals to the plurality of transponders representative of possible additional next bits of the n-bit digital address of the responsively transmitting transponders until the digital signals transmitted from the controller to the plurality of transponders representative of the possible first, next and additional next bits of the n-bit address correspond with the first, next and additional next bits of the n-bit address of the selected subset of the plurality of transponders. A last digital signal is transmitted from the controller to the plurality of transponders when the selected subset of the plurality of transponders has responsively transmitted a signal to the controller indicative of a predetermined n-bit address of the selected subset of the plurality of transponders.

Further disclosed is a method for initiating communications with a selected subset of a plurality of transponders in a common RF field of a controller, wherein each of the plurality of transponders has an n-bit address. The method comprises the steps of transmitting a first signal to the plurality of transponders to establish a given logic level of a first bit of the various n-bit addresses, wherein the transponders having the given logic level as the first bit of their n-bit address respond to said controller and the non-responding transponders enter a reset state. Alternatively, a next signal is transmitted to the plurality of transponders to establish an opposite logic level of the first bit of their n-bit addresses if none of the transponders respond to the first signal, wherein transponders having the opposite logic level as the first bit of their n-bit address respond to the controller and the non-responding transponders enter a reset state. Logic level inquiry signals are selectively transmitted to the plurality of transponders to establish a logic level of each remaining bit of their n-bit addresses, wherein the transponders having logic levels of the remaining bits of their n-bit address corresponding to the logic level inquiry signals respond to the controller and the non-responding transponders enter a reset state.

Still further disclosed is a method for initiating communications with a selected subset of a plurality of transponders in a common RF field of a controller, wherein each of the plurality of transponders has a unique, or commonly unique, n-bit address. The method comprises the steps of transmitting a series of digital signals from the controller to the transponders corresponding to the n-bit address of the selected subset of the plurality of transponders. A response is transmitted to the series of digital signals from the selected subset of the plurality of transponders and the plurality of transponders other than the selected subset of the plurality of transponders enter a reset state.

Also disclosed is a communications system for initiating communication between a controller and a selected subset of a plurality of transponders in a common RF field, wherein each of the transponders has a unique, or commonly unique, n-bit address. The system comprises transmitter means associated with the controller for transmitting a series of digital signals from the controller to the transponders corresponding to the n-bit address of the selected subset of the plurality of transponders. Response means associated with each of the plurality of transponders transmit a response to the series of digital signals if the series of digital signals corresponds to the transponder's n-bit address and reset means associated with each of the plurality of transponders cause the transponder to enter a reset state if the series of digital signals does not correspond to the transponder's n-bit address.

As previously described, the principles of the present invention are applicable to the initiation of communications with a particular individual transponder having a single, unique ID number as well as with a greater selected subset of a plurality of transponders wherein each of the selected subset have a uniquely common ID number or ID number segment. In this manner, identical data may be written to the selected subset of multiple transponders simultaneously.

BRIEF DESCRIPTION OF THE DRAWINGS

The foregoing, and other features and objects of the present invention, and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
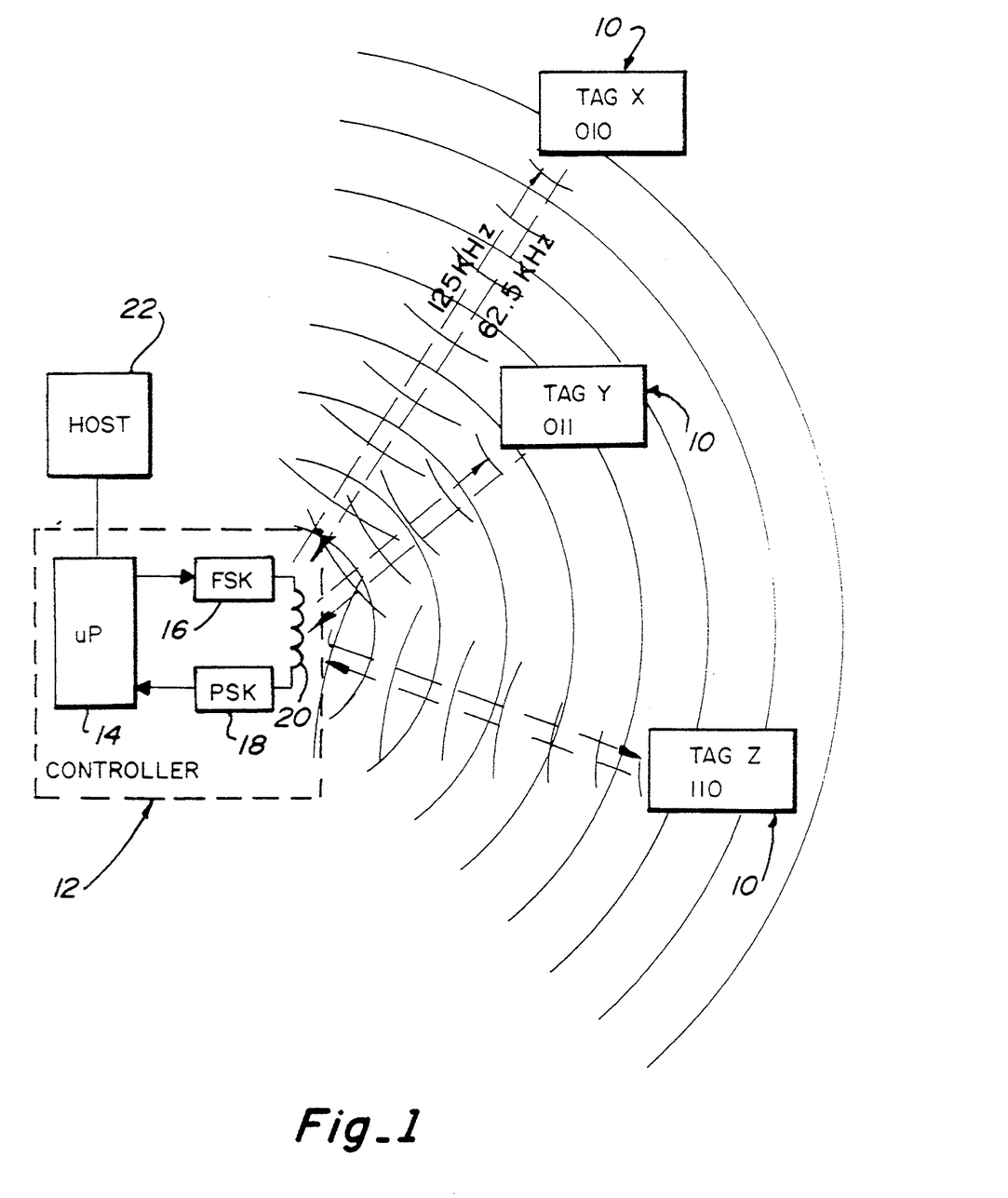
FIG. 1 is a simplified representational view of a number of passive RF/ID transponders (or "tags") which have been introduced within the powering electromagnetic field of an associated RF controller (or "reader") by means of which commands may be directed to a particular one of the transponders based upon its unique address via a 125 KHz FSK modulated signal and the appropriate transponder will respond via a PSK modulated 62.5 KHz signal while the remaining transponders enter a reset state.

With reference now to FIG. 1, a number of transponders 10, or "tags" are shown in conjunction with a controller 12, or "reader" comprising a communications system for reading data from and writing data to a selected one of the transponders 10.

The controller 12 comprises a microprocessor 14 for controllably operating an FSK transmit section 16 coupled to an antenna 20. The controller 12 broadcasts, for example, an FSK modulated 125 KHz signal to the transponders 10 to provide commands to a selected one of the transponders 10 to either read data from, or write data to, the on-board non-volatile memory array. In addition, the FSK modulated 125 KHz signal may also be utilized to derive on-board power for the non-volatile memory array and other associated logic blocks of the transponders 10.

In response to a command directed to a specific one of the transponders 10, that particular transponder 10 will respond with configuration data or data stored within the non-volatile memory array by means of, for example, a 62.5 KHz PSK modulated signal. This 62.5 KHz signal is received by the antenna 20 and is coupled to the microprocessor 14 by means of a PSK receive section 18. As shown, controller 12 may be coupled to a host computer 22 by means of an RS-232 or Wiegand interface.

If only a single transponder 10 is within the effective range of the FSK modulated signal transmitted from the controller 12, there can be no confusion about which transponder 10 is responding to commands from the controller 12 or attempting to communicate therewith. However, if multiple transponders 10 are in a common RF field of the controller 12, the controller 12 must, in certain applications, be able to single out each transponder 10 individually in order to eliminate the possibility of two transponders 10 attempting to communicate with the controller 12 at the same time thereby interfering with each other's transmissions leading to the possibility of data corruption.

In accordance with the a specific embodiment of the present invention, the transponders 10 will each have a unique binary ID number programmed into them. For example, "tag X" has the unique ID number of "010;" "tag Y" has the unique ID number of "011;" and "tag Z" has the unique ID number of "110." It should also be noted that the unique n-bit address may comprise any number of bits including 8, 16, 32 and the like. In accordance with a process more fully described hereinafter, the transponders 10 receive from the controller 12 a series of commands/questions to which they either respond, or do not respond and then reset themselves. The transponders 10 respond to the controller 12 in such a way that if multiple transponders 10 happen to respond, the controller 12 can recognize that at least one transponder 10 has responded. For individual responses, the controller 12 is not required to determine how many transponders 10 have responded. Fundamentally, the controller 12 sends a sequence of commands that single out an individual one of the transponders 10 based upon its unique ID number. The four commands that the controller 12 may send are:

RESET0—this resets all transponders 10 in the RF field and inquires of all transponders 10 as to whether they have a "zero" as the first bit of its unique ID number;

BIT0—this inquires of all transponders 10 within the RF field as to whether they have a "zero" in the current bit of its unique ID number;

BIT1—this inquires of the transponders 10 as to whether they have a "one" as the current bit of its unique ID number; and FOUND—is a command from the controller 12 to the transponders 10 within the common RF field that the proper one of the transponders 10 has been found.

With respect to the following exemplary embodiments, the RESET0 command corresponds to a "00"; the BIT0 command corresponds to a "01"; the BIT1 command corresponds to a "10" and the FOUND command corresponds to a "11".

With reference to the following Tables 1-8, a sequence of commands transmitted from a controller 12 to a plurality of transponders 10 are shown beginning with a "RESET0" and ending with a "FOUND" command. By intervening specific transmissions of the "BIT0" and "BIT1" commands corresponding to each current bit position in the unique ID number, the identity of a specific one of the transponders 10 may be determined based upon its unique ID number. Thus, the command sequence illustrated in Table 3 would, for example, identify "tag X" by the appropriate responses to the sequence of commands shown, which would concomitantly cause a reset of all other transponders 10 which do not have the same ID number and happen to be in the RF field of the controller 12. In like manner, Table 4 illustrates the sequence of commands for identifying "tag Y" while Table 7 illustrates the corresponding "RESET0," "BIT0," "BIT1," and "FOUND" commands necessary to identify "tag Z" with all other transponders 10 entering a reset state until the RESET0 command is again transmitted by the controller 12.

TABLE 1

| Tag ID | Command | | | | | |
|---|---|---|---|---|---|---|
| | A=0? | B=0? | C=0? | Found | | |
| A B C | 00 | 01 | 01 | 11 | | |
| 0 0 0 | Y | Y | Y | * | | |
| 0 0 1 | Y | Y | N | R | → | → |
| 0 1 0 | Y | N | R | → | → | → |
| 0 1 1 | Y | N | R | → | → | → |
| 1 0 0 | N | R | → | → | → | → |
| 1 0 1 | N | R | → | → | → | → |
| 1 1 0 | N | R | → | → | → | → |
| 1 1 1 | N | R | → | → | → | → |

TABLE 2

| Tag ID | Command | | | | | |
|---|---|---|---|---|---|---|
| | A=0? | B=0? | C=0? | C=1? | Found | |
| A B C | 00 | 01 | 01 | 10 | 11 | |
| 0 0 0 | Y | Y | Y | R | → | → |
| 0 0 1 | Y | Y | N | Y | * | |
| 0 1 0 | Y | N | R | → | → | → |
| 0 1 1 | Y | N | R | → | → | → |
| 1 0 0 | N | R | → | → | → | → |
| 1 0 1 | N | R | → | → | → | → |
| 1 1 0 | N | R | → | → | → | → |
| 1 1 1 | N | R | → | → | → | → |

TABLE 3

| Tag ID | Command | | | | | |
|---|---|---|---|---|---|---|
| | A=0? | B=0? | B=1? | C=0? | Found | |
| A B C | 00 | 01 | 10 | 01 | 11 | |
| 0 0 0 | Y | Y | R | → | → | → |
| 0 0 1 | Y | Y | R | → | → | → |
| 0 1 0 | Y | N | Y | Y | * | |
| 0 1 1 | Y | N | Y | N | R | → |
| 1 0 0 | N | R | → | → | → | → |
| 1 0 1 | N | R | → | → | → | → |
| 1 1 0 | N | R | → | → | → | → |
| 1 1 1 | N | R | → | → | → | → |

TABLE 4

| Tag ID | Command | | | | | |
|---|---|---|---|---|---|---|
| | A=0? | B=0? | B=1? | C=0? | C=1? | Found |
| A B C | 00 | 01 | 10 | 01 | 10 | 11 |
| 0 0 0 | Y | Y | R | → | → | → |
| 0 0 1 | Y | Y | R | → | → | → |
| 0 1 0 | Y | N | Y | Y | R | → |
| 0 1 1 | Y | N | Y | N | Y | * |
| 1 0 0 | N | R | → | → | → | → |
| 1 0 1 | N | R | → | → | → | → |
| 1 1 0 | N | R | → | → | → | → |
| 1 1 1 | N | R | → | → | → | → |

TABLE 5

| Tag ID | Command | | | | | |
|---|---|---|---|---|---|---|
| | A=0? | A=1? | B=0? | C=0? | Found | |
| A B C | 00 | 10 | 01 | 01 | 11 | |
| 0 0 0 | Y | R | → | → | → | → |
| 0 0 1 | Y | R | → | → | → | → |
| 0 1 0 | Y | R | → | → | → | → |
| 0 1 1 | Y | R | → | → | → | → |
| 1 0 0 | N | Y | Y | Y | * | |
| 1 0 1 | N | Y | Y | N | R | → |
| 1 1 0 | N | Y | N | R | → | → |
| 1 1 1 | N | Y | N | R | → | → |

TABLE 6

| Tag ID | Command | | | | | Found |
|---|---|---|---|---|---|---|
| | A=0? | A=1? | B=0? | C=0? | C=1? | |
| A B C | 00 | 10 | 01 | 01 | 10 | 11 |
| 0 0 0 | Y | R | → | → | → | → |
| 0 0 1 | Y | R | → | → | → | → |
| 0 1 0 | Y | R | → | → | → | → |
| 0 1 1 | Y | R | → | → | → | → |
| 1 0 0 | N | Y | Y | Y | R | → |
| 1 0 1 | N | Y | Y | N | Y | * |
| 1 1 0 | N | Y | N | R | → | → |
| 1 1 1 | N | Y | N | R | → | → |

TABLE 7

| Tag ID | Command | | | | | Found |
|---|---|---|---|---|---|---|
| | A=0? | A=1? | B=0? | B=1? | C=0? | |
| A B C | 00 | 10 | 01 | 10 | 01 | 11 |
| 0 0 0 | Y | R | → | → | → | → |
| 0 0 1 | Y | R | → | → | → | → |
| 0 1 0 | Y | R | → | → | → | → |
| 0 1 1 | Y | R | → | → | → | → |
| 1 0 0 | N | Y | Y | R | → | → |
| 1 0 1 | N | Y | Y | R | → | → |
| 1 1 0 | N | Y | N | Y | Y | * |
| 1 1 1 | N | Y | N | Y | N | R |

TABLE 8

| Tag ID | Command | | | | | | Found |
|---|---|---|---|---|---|---|---|
| | A=0? | A=1? | B=0? | B=1? | C=0? | C=1? | |
| A B C | 00 | 10 | 01 | 10 | 01 | 10 | 11 |
| 0 0 0 | Y | R | → | → | → | → | → |
| 0 0 1 | Y | R | → | → | → | → | → |
| 0 1 0 | Y | R | → | → | → | → | → |
| 0 1 1 | Y | R | → | → | → | → | → |
| 1 0 0 | N | Y | Y | R | → | → | → |
| 1 0 1 | N | Y | Y | R | → | → | → |
| 1 1 0 | N | Y | N | Y | Y | R | → |
| 1 1 1 | N | Y | N | Y | N | Y | * |

Utilizing the command/response mechanism described, and hereinafter disclosed in more detail with respect to FIGS. 2A, 2B and 3A, it is possible to effectuate a command/response sequence in 5 RF carrier cycles of a) two command bits, b) a first "space" bit of, for example a logic "1", c) a response bit and d) a second "space" bit, for example also a logic "1". An example is shown in the following Table 9. In the worst case, this then would require no more than 10 carrier cycles (or two commands) to identify any given current ID bit value.

TABLE 9

With respect to the above command sequence, it is important to note that with respect to any transponders 10 which may enter the powering RF field late, that only by specifically sending the RESET0 command from the powering controller 12 is there the possibility of any transponder 10 receiving two zero's in a row and thereby interpreting the same as the RESET0 command ("00").

As illustrated in the following Table 10, the command from the controller 12 may, instead, comprise a three bit command if the response(s) from one or more transponders 10 does not carry with it the possibility of interfering with the command transmitted from the controller 12. In the Racom communications system as previously noted, communications from the controller 12 to the transponders 10 is made using an FSK modulation technique while responses from the transponders 10 to the controller 12 are made via a PSK modulated signal. By utilizing this scheme, the communications from the transponders 10 to the controller 12 will not interfere with the commands transmitted from the controller 12.

TABLE 10

Figure 2A:
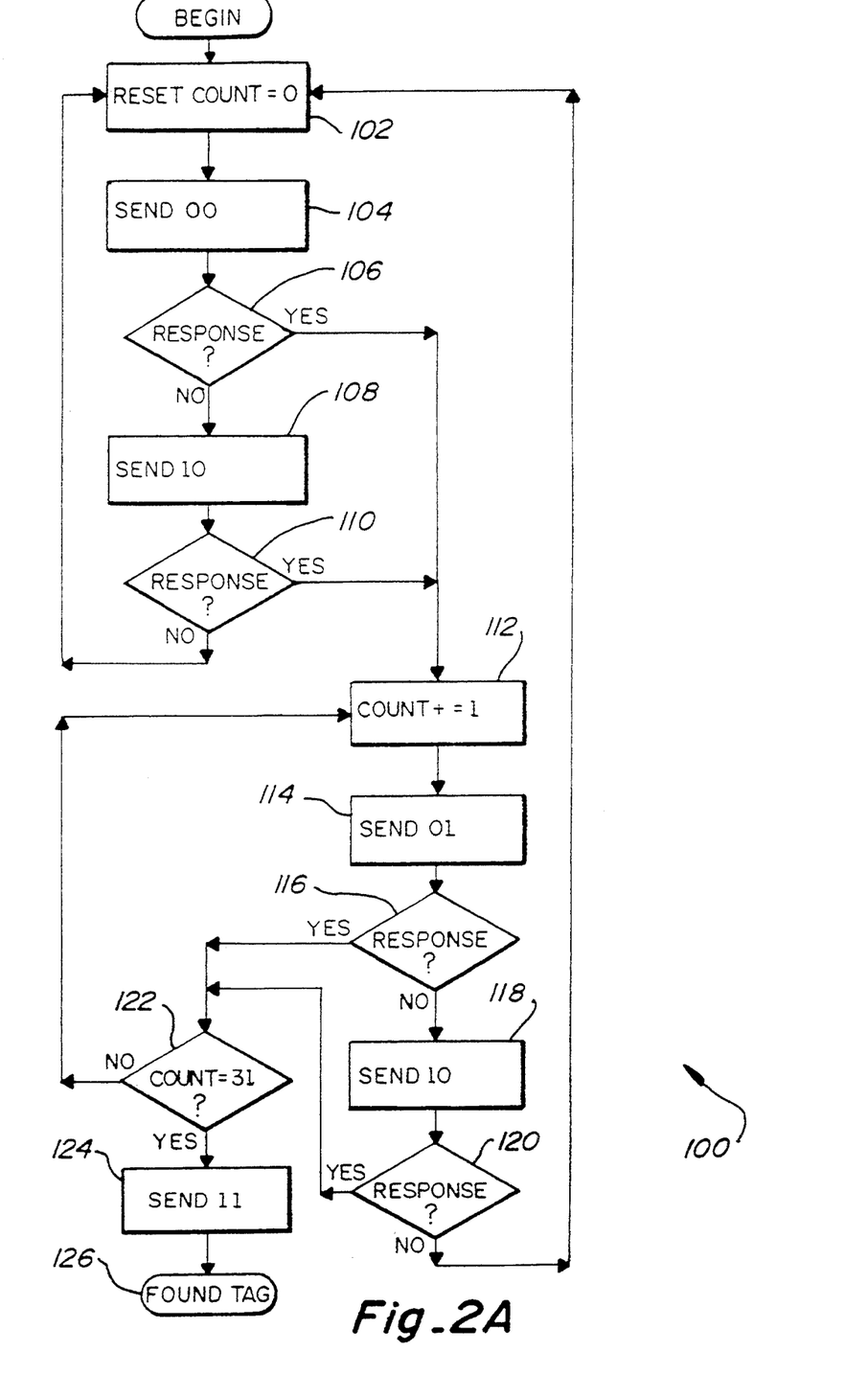
FIG. 2A is a logic flow diagram of, for example, the firmware of a controller microprocessor for sending predefined commands in a predefined sequence and monitoring responses thereto from a number of transponders in a common RF field which may be utilized for initiating communications with a particular target transponder based upon its unique ID number or address.

With reference additionally now to FIG. 2A, a logic flow 100 for effectuating the initiation of communications with a selected one of multiple transponders 10 within a common electric field of a controller 12 is shown which identifies a particular one of the transponders 10 in order. The logic flow 100 begins with a reset step 102 at which a reset count is set equal to zero. At send RESET0 step 104, the controller 12 sends a "00" to all transponders 10 within the common RF field. At decision step 106, the controller 12 determines whether or not one or more of the transponders 10 have responded to the RESET0 command. If a response from one or more of the transponders 10 is detected, the logic flow 100 proceeds to increment count step 112 as will be more fully described hereinafter.

Should a response not be detected to the RESET0 command the controller 12 firmware would then direct that a "10" be transmitted at send BIT1 step 108. Thereafter, at decision step 110, the controller 12 would determine whether or not a response was detected to the BIT1 command. If a response is not detected, the logic flow 100 returns to reset step 102. Alternatively, if a response is detected to the BIT1 command, then the count is incremented at increment count step 112 by one.

Following increment count step 112, the controller 12 will send a "01" at send BIT0 step 114. Thereafter, the controller 12 will monitor the transponders 10 within the RF field to see whether or not there was a response at decision step 116. If a response is not detected at decision step 116, then the controller 12 will send a "10" at send BIT1 step 118. If a response is detected from a transponder 10 at decision step 116 or decision step 120, then, at terminal count decision step 122 it is determined whether or not the count has equalled a value of "31", or $2^5-1$, which is equal to the number of unique ID bits-1. If, at terminal count decision step 122, the terminal count of "31" has not been reached, then the logic flow 100 returns to increment count step 112. If the count value is now equal to "31", then at send step 124 the command "FOUND" or "11", will be transmitted to all of the transponders 10 within the RF field and the Found Tag step 126 is reached. If, at decision step 120, a response is not detected from a transponder 10, the logic flow 100 would also return to reset step 102 as shown.

Figure 2B:
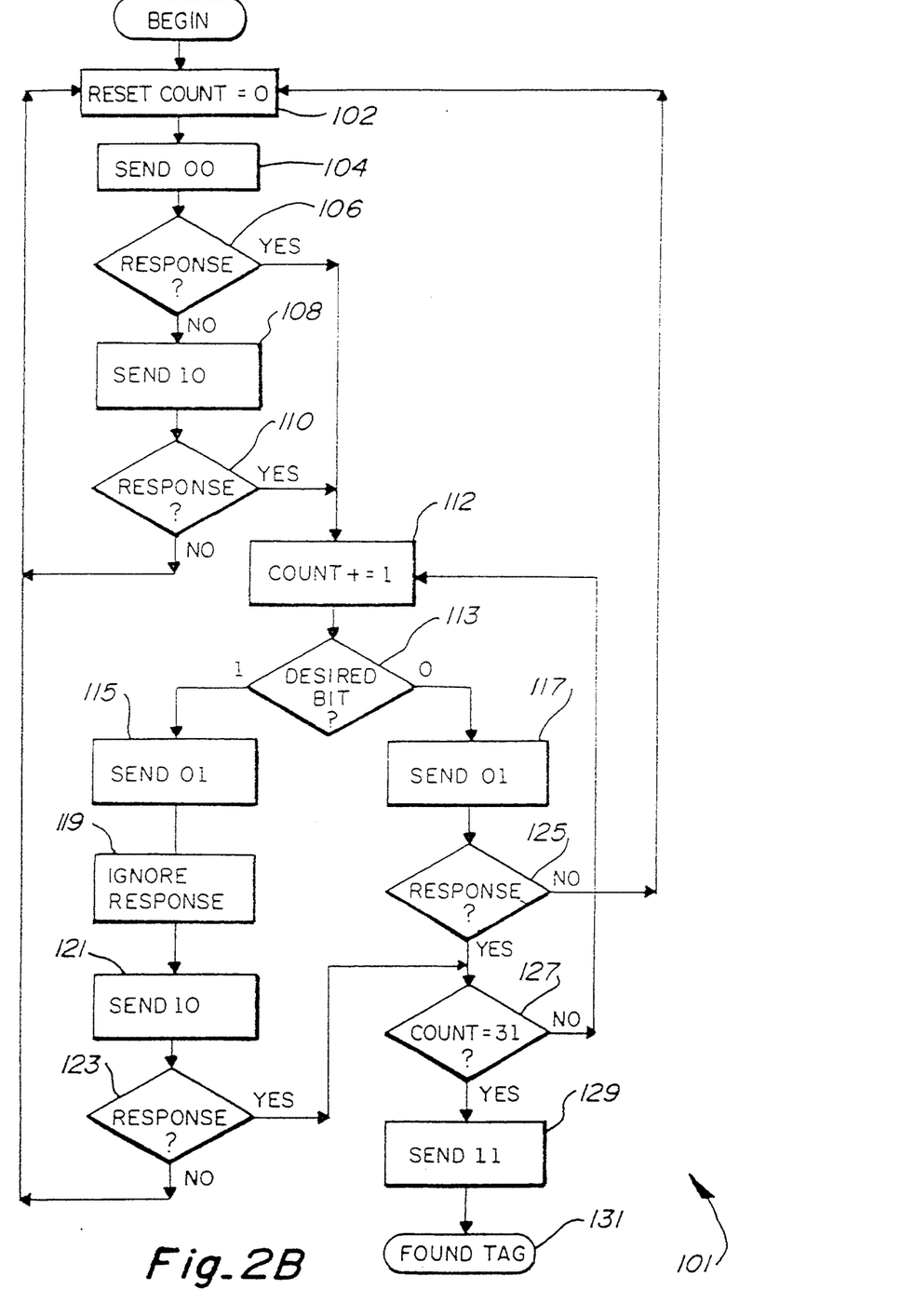
FIG. 2B is an additional logic flow diagram of, for example, the firmware of a controller microprocessor for sending predefined commands in a specific sequence and monitoring responses thereto from a number of transponders in a common RF field which may be utilized for initiating communications with a specific target transponder or other selected subset of transponders.

With reference additionally now to FIG. 2B, an additional controller 12 logic flow 101 is illustrated for finding a specific transponder 10 by purposefully seeking out a transponder 10 with a particular n-bit address. With respect to this flowchart, like steps to those previously described with respect to steps 102 through 110 of FIG. 2A are like numbered and the foregoing description thereof shall suffice herefor.

Following step 112, a decision step 113 is reached where, if the desired bit is a "1", the process proceeds to step 115 to send a "01". Alternatively, if the desired bit is a "0", then at step 117 a "01" is also transmitted and a decision step 125 is reached. At decision step 125, if no response is received the process returns to step 102 to reset the count to "0". Alternatively, if a response is received, the process proceeds to an additional decision step 127 as will be more fully described hereinafter.

Following step 115 at step 119, regardless of the response received from the transponders 10, the controller 12 ignores it and sends a "10" at step 121. Then, at decision step 123, if a response is not received, the process returns to step 102 to reset the count to "0". Alternatively, the process proceeds to decision step 127 where, if the count is not equal to "31", the process returns to step 112 to increment the count by "1". If the count is now equal to "31" then, at step 129 a "11" is transmitted to the transponders 10 and the process concludes at Found Tag step 131.

Figure 3A:
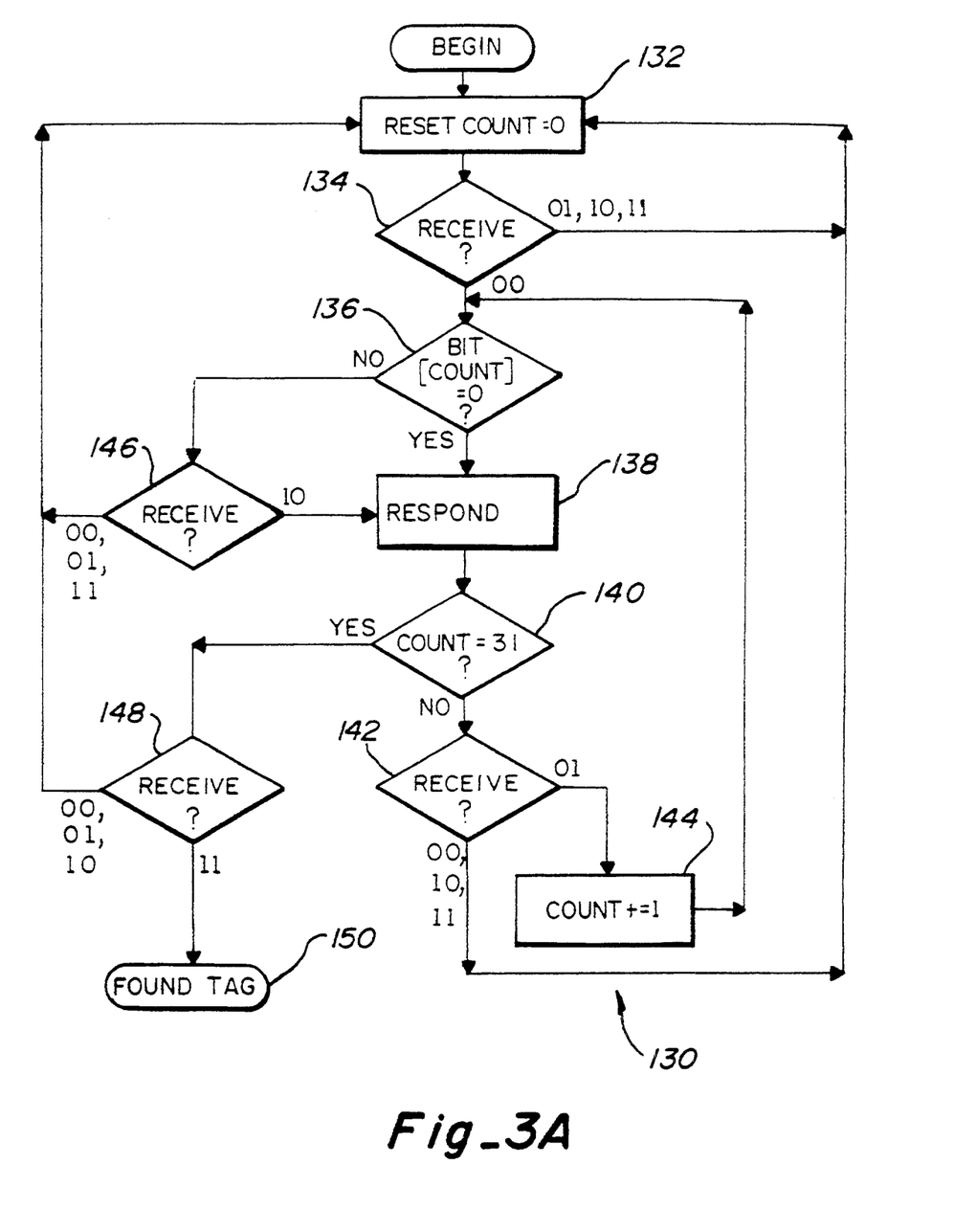
FIG. 3A is a logic flow diagram for the control logic or finite state machine of a transponder useful in conjunction with the controller logic flow of FIG. 2A or 2B for identifying a particular one of a plurality of transponders based on its unique ID number while simultaneously causing any other transponders within the RF field of the controller to enter a reset state.

With reference now to FIG. 3A, a transponder logic flow 130 is shown. Transponder logic flow 130 begins with a reset step 132 at which the count value is reset to zero. Thereafter, at decision step 134 a determination is made as to whether a RESET0 command ("00") was received. If the RESET0 command was received, the transponder logic flow 130 proceeds to decision step 136. However, if RESET0 was not received, and one of BIT0 ("01"), BIT1 ("10") or FOUND ("11") was detected instead, then the process returns to reset step 132. At decision step 136, if the value of Bit[count] equals zero, then the transponder logic flow 130 proceeds to respond step 138. If the value of Bit[count] is not equal to zero, then at decision step 146 it is determined whether or not the BIT1 command was received. If the BIT1 command has been received, the transponder logic flow 130 proceeds to responder step 138. Alternatively, if any other command has been received, the transponder logic flow 130 returns to the reset step 132.

At terminal count decision step 140, it is determined whether a terminal count of "31" has been reached on the internal counter. If the terminal count has been reached, then the transponder logic flow 130 proceeds to decision step 148 to indicate that the appropriate transponder 10 has been determined at Found Tap step 150, if a "11" has been received If a "00", "01" or "10" has been received instead, decision step 148 is followed by reset step 131. If the terminal count has not been reached at terminal count decision step 140 then at decision step 142, the transponder 10 determines whether the "BIT0" command has been received and, if so, the transponder logic flow 130 then proceeds to increment count step 144 where the count value is increased by one. Alternatively, if a command other than BIT0 command has been received, the transponder logic flow 130 returns to the reset step 132.

With respect to the foregoing figures, the controller 12 initially sends the RESET0 ("00") command resetting all of the transponders 10 within the effective RF field of the controller 12. All of the transponders 10 that have a "0" in the first bit position of their unique ID number respond to the controller 12. The controller 12 will then proceed to undertake two alternative courses of action, based upon whether or not it has received a response to the RESET0 command. If the controller 12 detects a response, it increments an internal counter and sends the BIT0 ("01") command. If, on the other hand, the controller 12 does not detect a response, it sends the BIT1 ("10") command.

Upon reception of the second command, each individual transponder 10 reacts in a manner dependent upon which command is received. If the transponder 10 has a "1" in the first bit position and it receives the BIT0 command, it resets itself. Alternatively, if the transponder 10 has a "1" in the first bit position and it receives the BIT1 command, it responds and increments its internal counter. If the transponder 10 has a "0" in the first bit position and it receives the BIT0 command, it responds if it has a "0" in the second bit of its unique ID number.

Each transponder 10, therefore, responds based on the digital value of its unique ID number and the sequence of commands received from the controller 12. All transponders 10 not receiving the correct sequence of commands will reset themselves during the communication sequence and refrain from responding to further commands from the controller 12 until the command RESET0 is sent. In this manner, only a single transponder 10 will not reset itself during this initial communication. This transponder 10 may then be communicated to without interference from other transponders 10 which may also be in the common RF field. Additionally, if the controller 12 wants to single out a particular transponder 10 with a specific unique ID number, it only need send a specific sequence of commands based on the unique ID number desired and verify that it receives responses at the appropriate times. All other transponders 10 will reset themselves as a result of the commands sent.

Figure 3B:
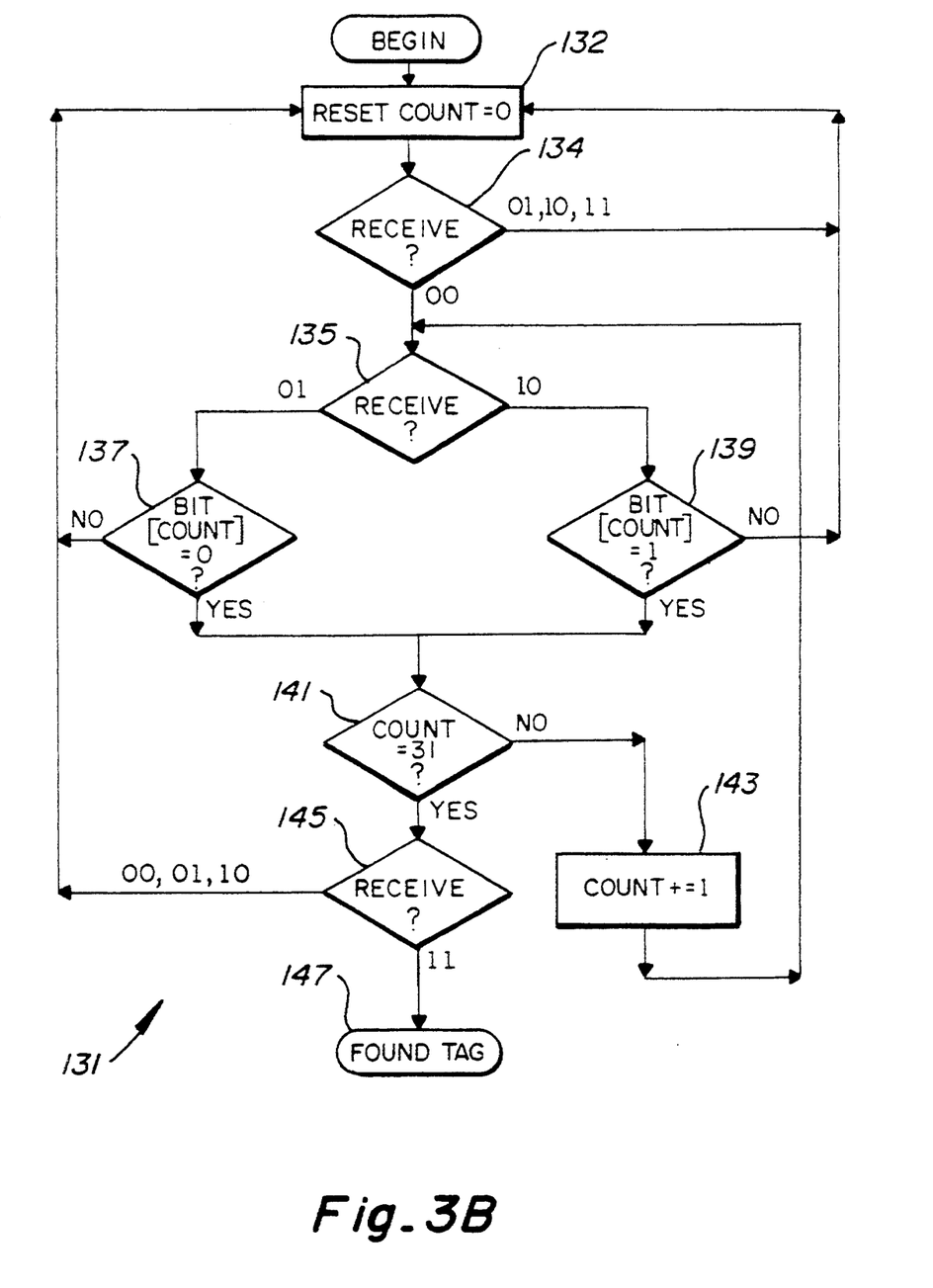
FIG. 3B is an additional logic flow diagram for the control logic or finite state machine of a transponder useful for more rapidly identifying a particular one of a plurality of transponders utilizing a single command for each bit in the unique ID number of the transponder.

With reference now to FIG. 3b an alternative logic flow 131 for a transponder 10 is shown which allows for the rapid identification of a given transponder 10. With respect to this flowchart, the commands previously described have been modified to reflect the following: "00" is a reset command; "01" is a command inquiring as to whether or not the current bit is a "0"; "10" is a command inquiring as to whether or not the current bit is a "1"; and "11" is a Found Tag command as before described. In this figure, like steps to those previously described with respect to steps 132 and 134 of the logic flow of FIG. 3A are like numbered and the foregoing description thereof shall suffice herefor.

Following decision step 134, a decision step 135 is reached where, if the transponder 10 has received a "01" or "10" command the process proceeds to decision steps 137 or 139 respectively. At decision step 137, if Bit[Count]=0, (or at decision step 139, if Bit[Count]=1) the logic proceeds to decision step 141. Alternatively, at decision steps 137 and 139 if the result is not true, the process returns to step 132 and the count is reset to "0".

At decision step 141, if the count is not equal to "31", the process proceeds to step 143 where the count is incremented by "1" and decision step 135 is repeated. If the count is equal to "31" at decision step 141 then, at decision step 145, if a "00", "01" or "10" has been received the process returns to step 132 to reset the count to "0". On the other hand, if the command received by the transponder 10 is a "11", then the process ends with Found Tag step 147.

While there have been described above, the principles of the invention in conjunction with specific apparatus and methods, it should be clearly understood that the foregoing description is made only by way of example and not as a limitation to the scope of the invention. Particularly, the principles of the present invention are applicable to the initiation of communication with a selected subset of transponders which may include a single transponder having a unique ID number or a larger subset of transponders having a uniquely common ID number or ID number segment.

What is claimed is:

1. A method for initiating communications between a controller and a selected subset of a plurality of transponders wherein each of said transponders includes an n-bit digital address, the method comprising the steps of:

initially transmitting a first digital signal from said controller to said plurality of transponders representative of a possible first bit of said n-bit digital address of said plurality of transponders;

responsively transmitting a signal from a first subset of said plurality of transponders having said possible first bit as said first bit of its n-bit digital address to said controller, said non-responsively transmitting transponders alternatively entering a reset state;

nextly transmitting a next digital signal from said controller to a responding plurality of transponders representative of a possible next bit of said n-bit digital address of said first subset of said plurality of transponders;

responsively transmitting a signal from a second subset of said first subset of transponders having said possible next bit as said next bit of its n-bit digital address to said controller, said non-responsively transmitting transponders alternatively entering a reset state; and alternatively transmitting additional next digital signals from said controller to said plurality of transponders representative of possible additional next bits of said n-bit digital address of said responsively transmitting transponders until said digital signals transmitted from said controller to said plurality of transponders representative of said possible first, next and additional next bits of said n-bit address correspond witch said first, next and additional next bits of said n-bit address of said selected subset of said plurality of transponders.

2. The method of claim 1 further comprising the step of:

lastly transmitting a last digital signal from said controller to said plurality of transponders when said one of said plurality of transponders has responsively transmitted a signal to said controller indicative of a predetermined n-bit address of said selected one of said plurality of transponders.

3. The method of claim 1 further comprising the step of:

secondarily transmitting a second digital signal from said controller to said plurality of transponders representative of an alternative possible first bit of said n-bit digital address of said plurality of transponders if no transponders responsively transmit a signal in response to said first digital signal.

4. The method of claim 1 wherein said steps of initially, nextly and alternatively transmitting are carried out by means of an FSK modulated RF signal.

5. The method of claim 1 wherein said steps of responsively transmitting are carried out by means of a PSK modulated RF signal.

6. The method of claim 1 wherein said n-bit address comprises three digital bits.

7. The method of claim 1 wherein said first, next and additional next signals comprise two digital bits.

8. The method of claim 2 wherein said last digital signal comprises two digital bits.

9. A method for initiating communications with a selected subset of a plurality of transponders in a common RF field of a controller, wherein each of said plurality of transponders has an n-bit address, said method comprising the steps of:

transmitting a first signal to said plurality of transponders from said controller to establish a given logic level of a first bit of said n-bit addresses wherein said transponders having said given logic level as said first bit of their n-bit address respond to said controller and said non-responding transponders enter a reset state and alternatively transmitting a next signal to said plurality of transponders from said controller to establish an opposite logic level of said first bit of said n-bit addresses if none of said transponders respond to said first signal wherein said transponders having said opposite logic level as said first bit of their n-bit address respond to said controller and said non-responding transponders enter a reset state; and selectively transmitting logic level inquiry signals to said plurality of transponders from said controller to establish a logic level of each remaining bit of said n-bit addresses wherein said transponders having logic levels of said remaining bits of their n-bit address corresponding to said logic level inquiry signals respond to said controller and said non-responding transponders enter a reset state.

10. The method of claim 9 further comprising the step of:

lastly transmitting a transponder found signal to said plurality of transponders in said common RF field in response to a remaining one of said transponders having an n-bit address corresponding to said first and logic level inquiry signals.

11. The method of claim 9 wherein said steps of transmitting and selectively transmitting are carried out by means of an FSK modulated RF signal.

12. The method of claim 9 wherein said transponders respond to said steps of transmitting and selectively transmitting by means of a PSK modulated RF signal.

13. The method of claim 9 wherein said n-bit address comprises three digital bits.

14. The method of claim 9 wherein said first and logic level inquiry signals comprise two digital bits.

15. The method of claim 10 wherein said transponder found signal comprises two digital bits.

16. A method for initiating communications with a selected subset of a plurality of transponders in a common RF field of a controller, wherein each of said plurality of transponders has an n-bit address, said method comprising the steps of:

transmitting a series of digital signals from said controller to said transponders corresponding to said n-bit address of said selected subset of said plurality of transponders; and transmitting a response to said series of digital signals from said selected subset of said plurality of transponders to said controller, said plurality of transponders other than said selected subset of said plurality of transponders entering a reset state.

17. The method of claim 17 wherein said digital signals are transmitted by means of an FSK modulated RF signal.

18. The method of claim 17 wherein said response is transmitted by means of a PSK modulated RF signal.

19. The method of claim 17 wherein said n-bit address comprises three digital bits.

20. The method of claim 17 wherein said digital signals comprise two digital bits.

21. The method of claim 17 wherein said response comprises one digital bit.

22. A communications system for initiating communication between a controller and a selected subset of a plurality of transponders in a common RF field, each of said transponders having an n-bit address, the system comprising:

transmitter means associated with said controller for transmitting a series of digital signals from said controller to said transponders corresponding to said n-bit address of said selected subset of said plurality of transponders;

response means associated with each of said plurality of transponders for transmitting a response to said series of digital signals if said series of digital signals corresponds to said transponder's n-bit address; and reset means associated with each of said plurality of transponders for causing said transponder to enter a reset state if said series of digital signals does not correspond to said transponder's n-bit address.

23. The communications system of claim 22 wherein said transmitter means comprises a microprocessor controlled FSK transmit section.

24. The communications system of claim 22 wherein said series of digital signals comprises an FSK modulated signal of substantially 125 KHz–116.3 KHz.

25. The communications system of claim 23 wherein said response means comprises a PSK transmit section.

26. The communications system of claim 22 wherein said response comprises a PSK modulated signal of substantially 62.5 KHz.

27. The communications system of claim 23 wherein said n-bit address comprises three digital bits.

28. The communications system of claim 23 wherein said digital signals comprise two digital bits.

29. The communications system of claim 23 wherein said response comprises one digital bit.

* * * * *